Oct. 24, 1933.    W. S. TATUM    1,932,327
TRUCK BODY
Filed March 22, 1932    10 Sheets-Sheet 1
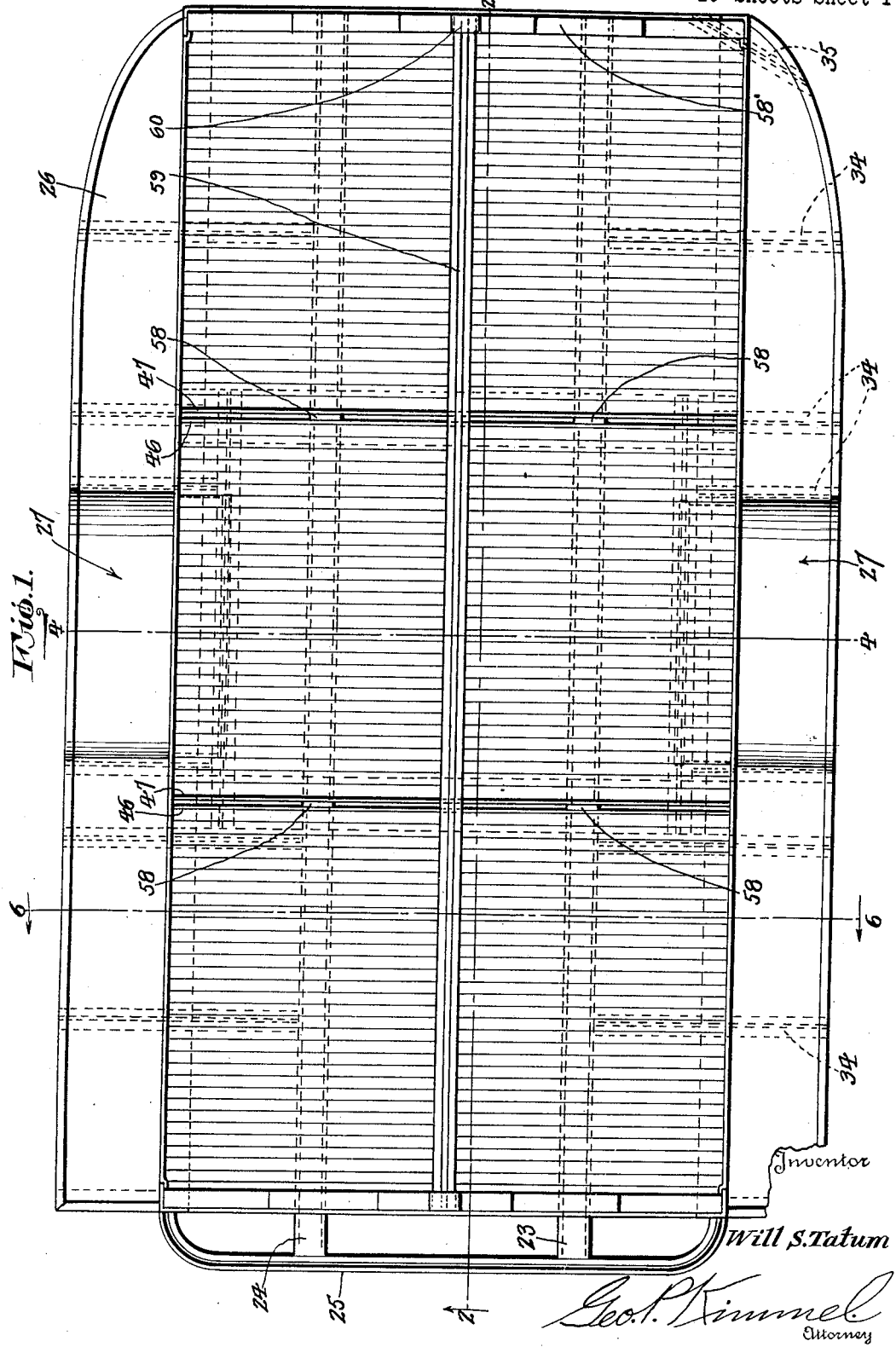
Inventor
Will S. Tatum
Geo. P. Kimmel
Attorney

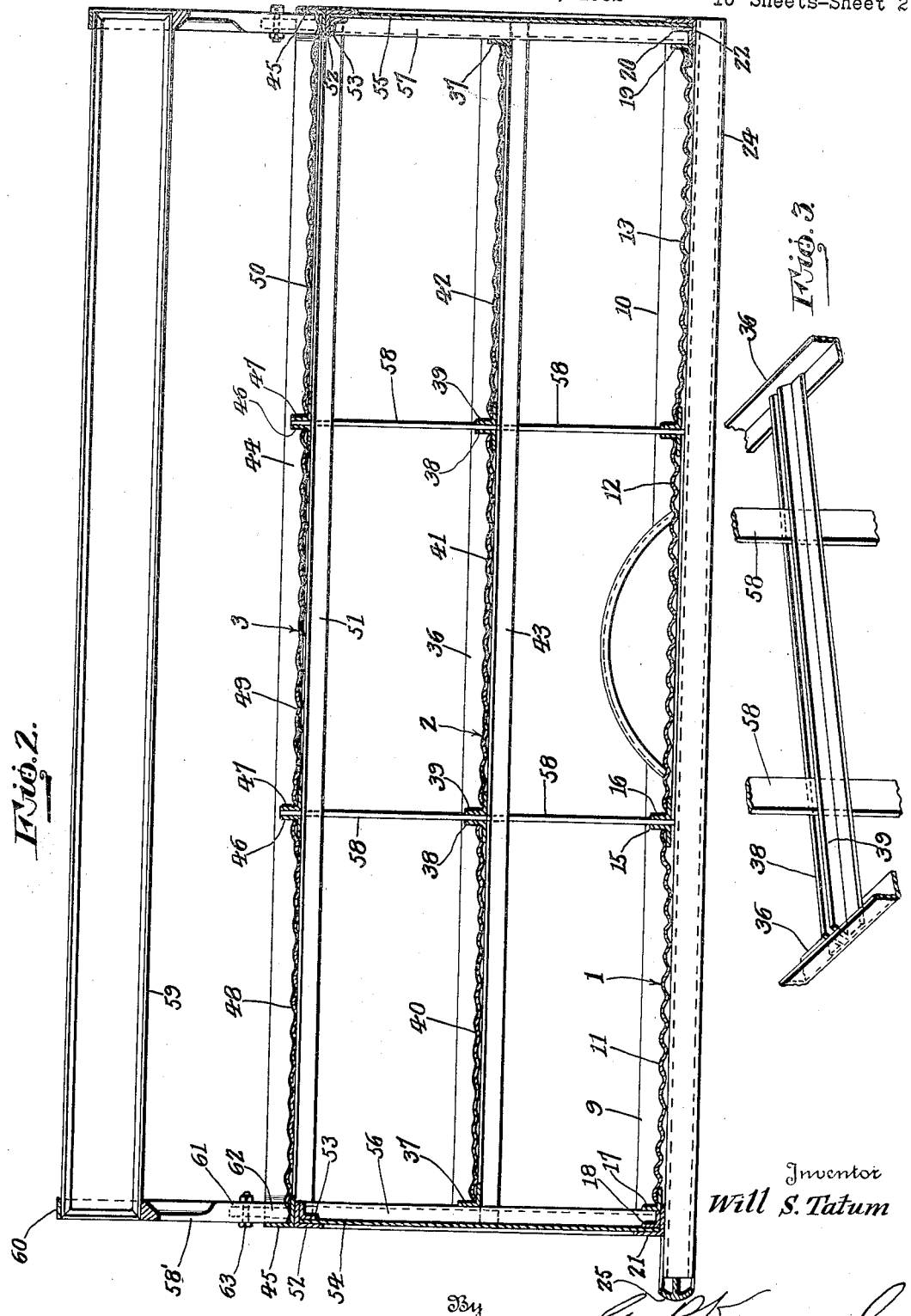

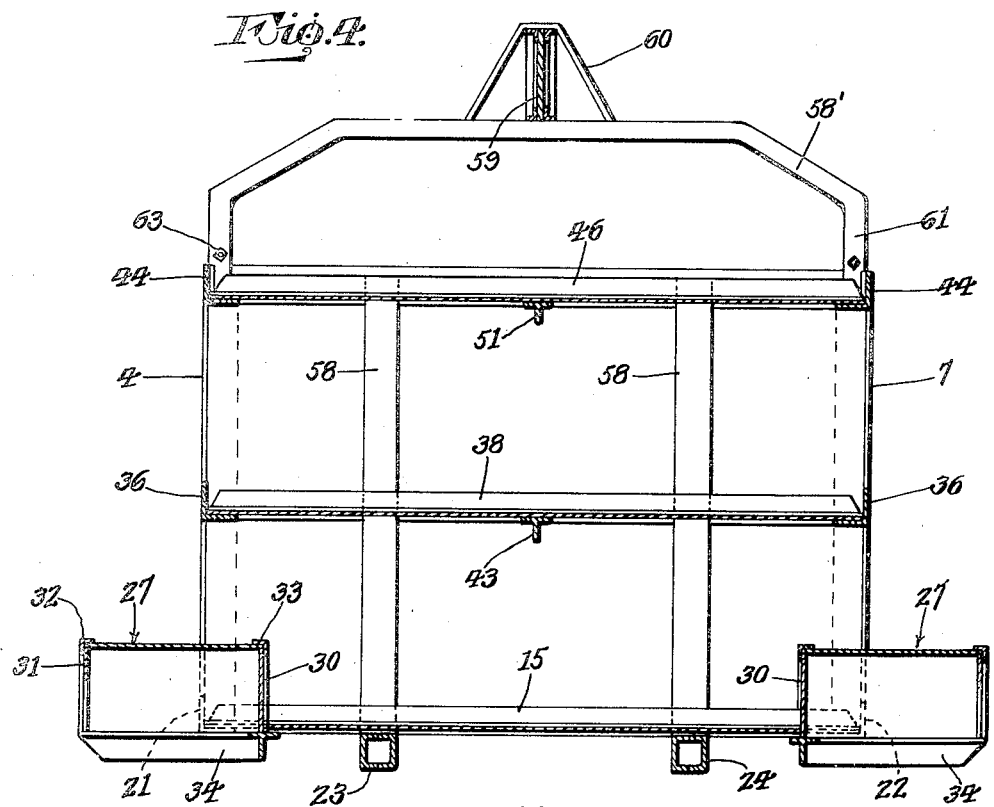
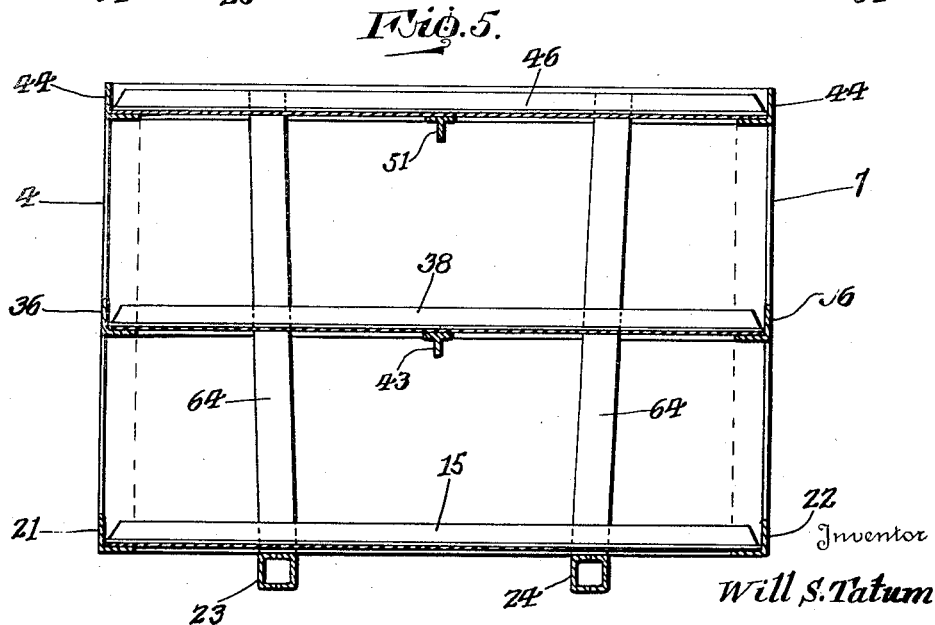

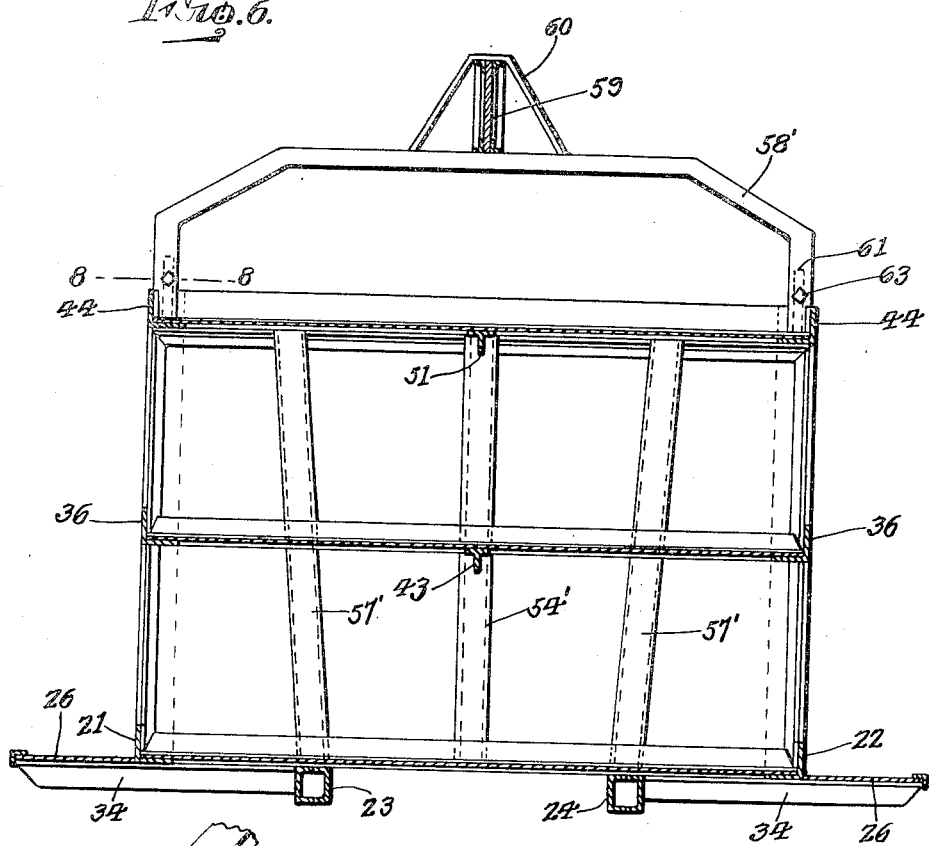
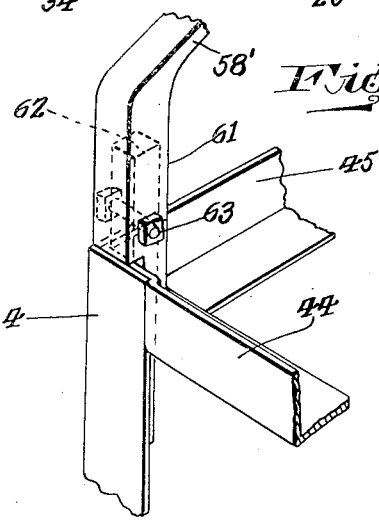
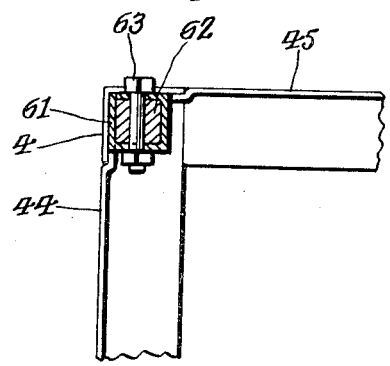

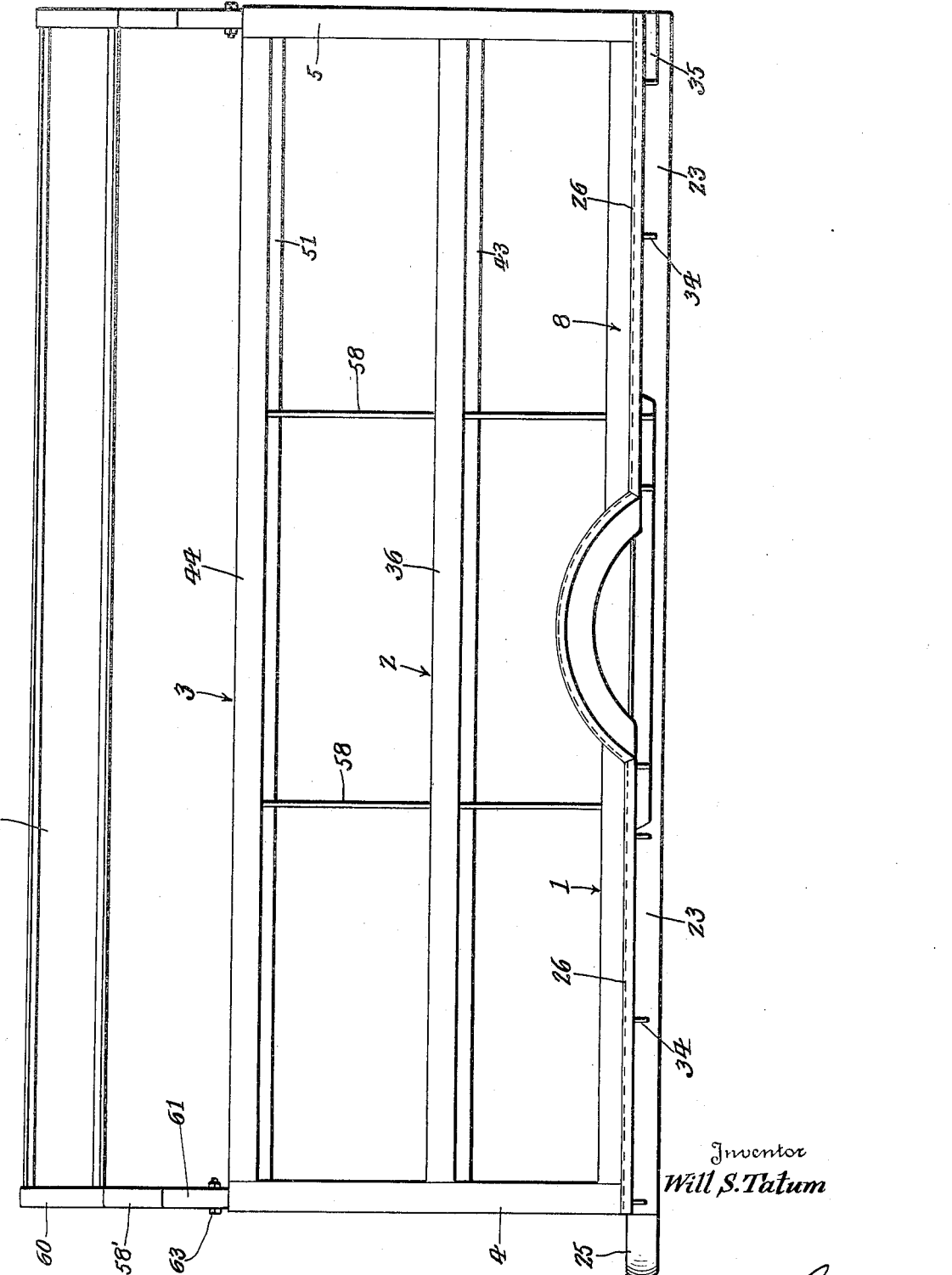

Oct. 24, 1933.     W. S. TATUM     1,932,327
TRUCK BODY
Filed March 22, 1932     10 Sheets-Sheet 6
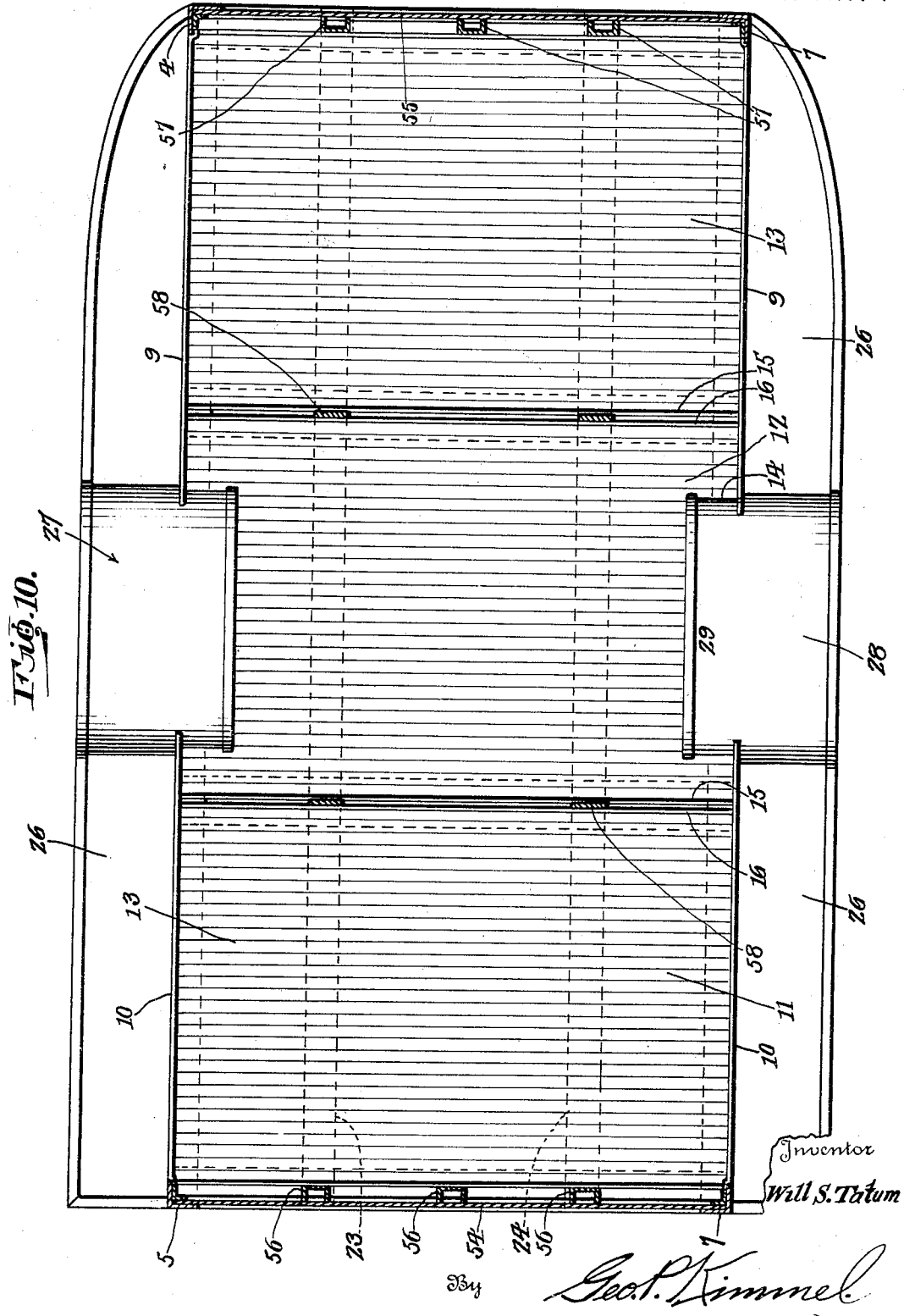
Inventor
Will S. Tatum
By Geo. P. Kimmel
Attorney Inventor
Will S. Tatum By Geo. P. Kimmel
Attorney

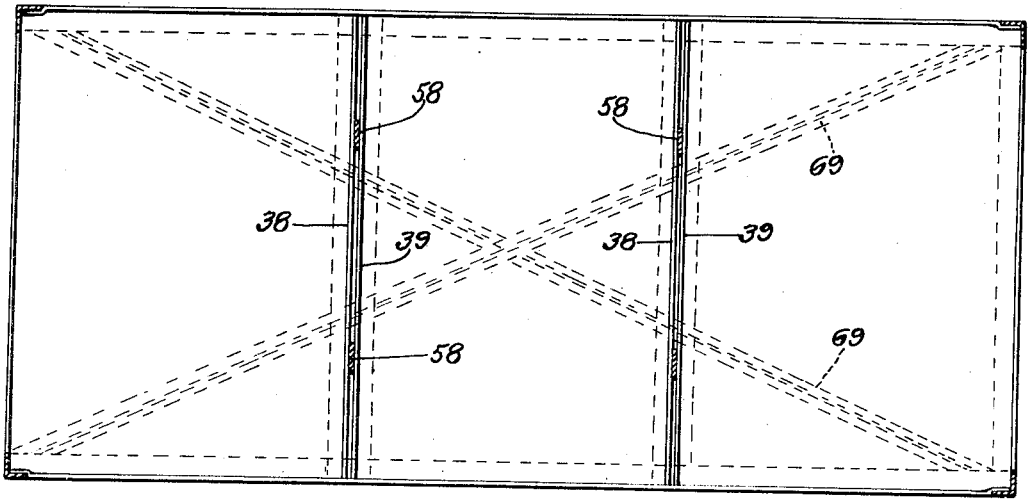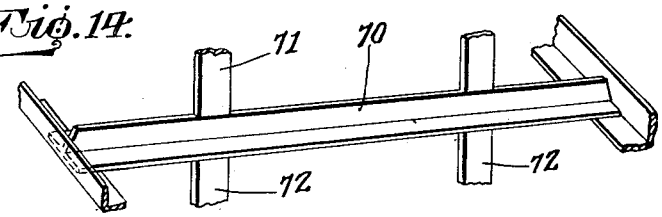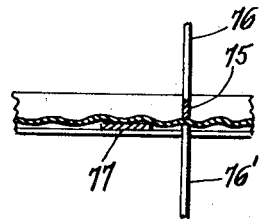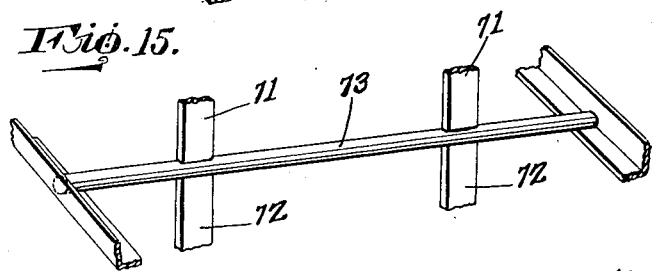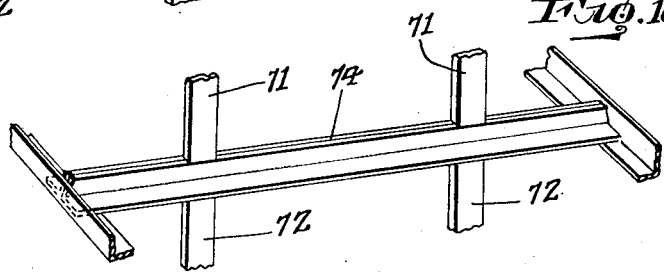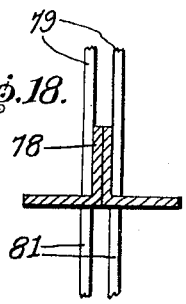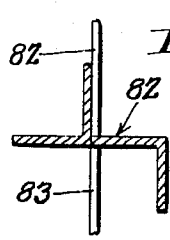

Oct. 24, 1933.    W. S. TATUM    1,932,327
TRUCK BODY
Filed March 22, 1932    10 Sheets-Sheet 9
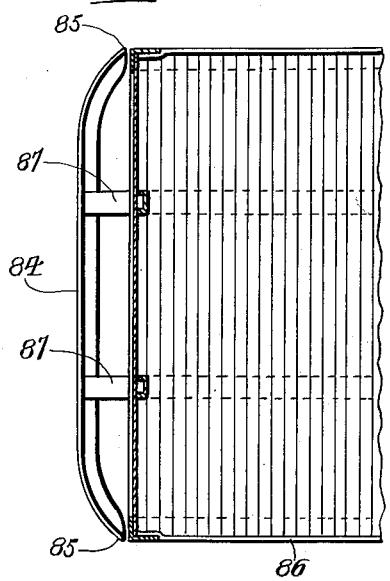
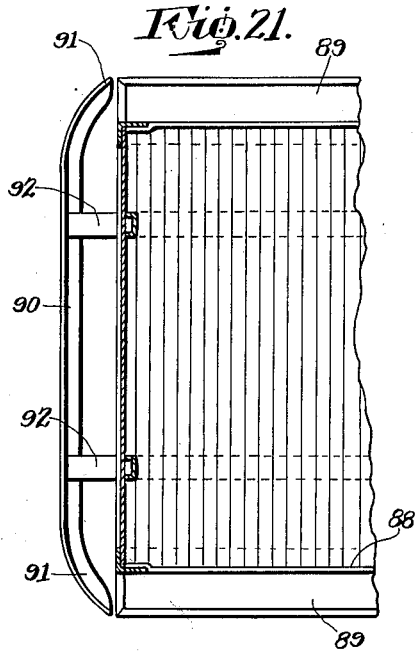
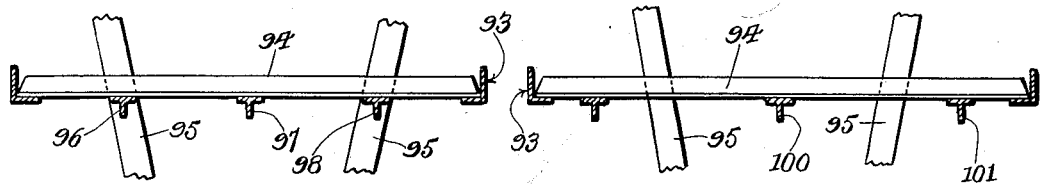
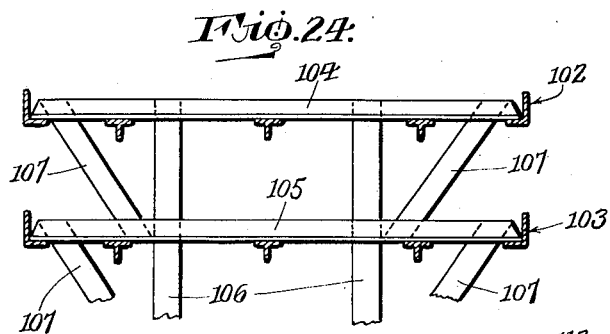
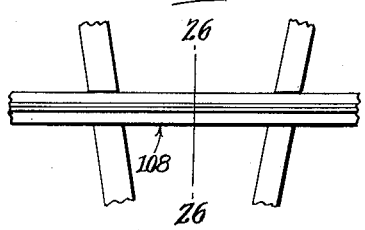
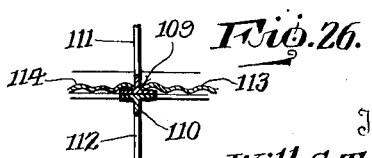
Inventor
Will S. Tatum
By Geo. P. Kimmel
Attorney Oct. 24, 1933.  W. S. TATUM  1,932,327
TRUCK BODY
Filed March 22, 1932  10 Sheets-Sheet 10

Inventor
Will S. Tatum

By Geo. P. Kimmel
Attorney

Patented Oct. 24, 1933

1,932,327

UNITED STATES PATENT OFFICE 1,932,327

TRUCK BODY

Will S. Tatum, Hattiesburg, Miss., assignor to The Weldmech Steel Products Co., Hattiesburg, Miss., a corporation of Mississippi.

Application March 22, 1932. Serial No. 600,527

3 Claims. (Cl. 296—3)

This invention relates to a truck body designed primarily for the handling of crated, cased or boxed bottled goods, but it is to be understood that a truck body, in accordance with this invention, may be employed for any character of haulage for which it is found applicable, and the invention has for its object to form the body with upright supporting elements so constructed and arranged for carrying the weight of the body and load weight directly to the chassis frame.

A further object of the invention is to provide, in a manner as hereinafter set forth, a construction of truck body which eliminates the use of the heavy crosswise T's and a part of the longitudinal T's for supporting the floor.

A further object of the invention is to provide, in a manner as hereinafter set forth, a truck body whereby the upright deck column supports are arranged inwardly of the edges of the body directly over the chassis frame.

A further object of the invention is to provide, in a manner as hereinafter set forth, a plural deck truck body including upright deck column supports arranged inwardly of the edges of the decks, and with each column common to the several decks and extending from a sub-frame to a point above the flooring of the uppermost deck.

A further object of the invention is to provide, in a manner as hereinafter set forth, a plural deck truck body having each deck thereof including a set of transversely extending spaced pairs of oppositely disposed spaced angle bars to which are secured and between which extend upright deck column supports, each being common to the number of decks, and with the pairs of angle bars for each deck dividing the latter into compartments or sections, separating and spacing each set of loaded cases or crates in its own compartment section, thereby taking and proportioning to each of these compartments or sections, part of the truck body and payload stresses caused by the shifting of the cases or crates by sudden stopping and starting of the truck.

A further object of the invention resides in setting up of the inwardly arranged upright deck column supports of a length to extend from the floor of a lower deck to the floor of an upper deck, and each secured to the top edges of a pair of transverse angle bars of a lower deck and the bottoms of a pair of transverse angle bars of an upper deck, or secured between a pair of transverse angle bars of a lower deck and between a pair of transverse angle bars of an upper deck.

Further objects of the invention are to provide, in a manner as hereinafter set forth, a plural deck truck body which is simple in its construction and arrangement, strong, durable, thoroughly efficient for the purpose intended, readily assembled and comparatively inexpensive to manufacture.

With the foregoing objects, and others which may hereinafter appear, the invention consists of the novel construction as hereinafter set forth, and illustrated in the accompanying drawings, in which are shown embodiments of the invention, but it is to be understood that changes, variations and modifications can be resorted to which fall within the scope of the invention as claimed.

In the drawings:

Figure 1 is a top plan view of a plural deck truck body in accordance with this invention.

Figure 2 is a section on line 2—2 Figure 1.

Figure 3 is a fragmentary detail in perspective of a deck of the truck body.

Figure 4 is a section on line 4—4 Figure 1.

Figure 5 is a cross sectional view of a modified form.

Figure 6 is a cross sectional view of another modified form.

Figure 7 is a fragmentary view in perspective illustrating one of the corners of the upper deck of the truck body.

Figure 8 is a section on line 8—8 Figure 6.

Figure 9 is a side elevation of the truck body.

Figure 10 is a sectional plan showing the bottom deck.

Figure 13 is a sectional plan of still another modified form of the truck body.

Figures 14, 15 and 16 are fragmentary views in perspective showing modified forms of a deck.

Figures 17, 18 and 19 are sectional details illustrating still further modified forms of a deck.

Figures 20 and 21 are fragmentary views in sectional plan illustrating modified forms of bumper arrangements.

Figures 22 to 28 are fragmentary views illustrating further modified forms of deck supports.

Figure 11:
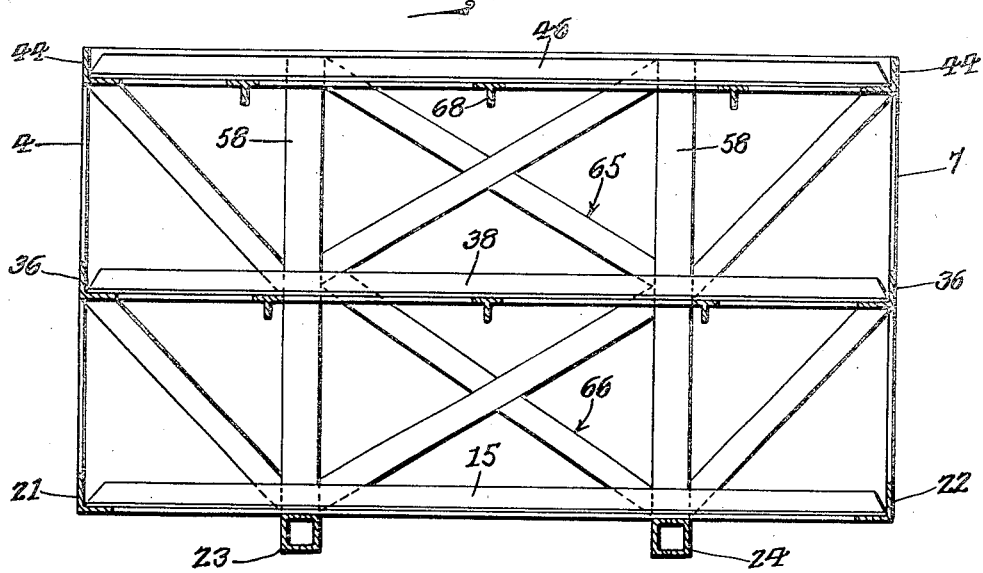
Figure 11 is a cross sectional view of still another modified form of the truck body.

Referring to Figures 1 to 4 and 7 to 10, the truck body is shown as consisting of three decks, but the number of decks can be increased or decreased if desired. The decks are generally indicated at 1, 2 and 3.

The truck body includes vertical corner irons 4, 5, 6 and 7 of angle shape cross section and which are common to the several decks.

The bottom deck 1 includes a pair of side rails referred to generally at 8 and each of which is formed of a pair of spaced end-wise opposed parts 9, 10. Each part of each side rail is of angle shape cross section to provide an inwardly extending horizontal flange or leg and a vertically disposed flange or leg integral with the outer side of the horizontal flange. Seated upon as well as being secured to the horizontal legs of parts 9, 10 are spaced corrugated floor sections 11, 12 and 13. The section 12 is cutout centrally of each side thereof as at 14. Mounted upon and secured to the horizontal legs of the parts 9, 10 are spaced pairs of spaced angle bars. The bars of each pair are indicated at 15, 16. Each bar includes a vertical flange and a horizontal flange and with the former extending upwardly from the inner side of the latter. Secured upon the horizontal flanges of the bars 15, 16 are the floor sections 11, 12 and 13. The floor sections and bars 15, 16 extend to the vertical legs of the side rails 8. The vertical flanges of the bars 15, 16 have the ends thereof inclined inwardly. The bars of each pair are oppositely disposed and the vertical flanges thereof are arranged in opposed spaced relation. The vertical legs of side rails 8 abut and overlap an edge of the corner rails. Seated upon the forward ends of the horizontal legs of the parts 9 of the side rails 8 is a transverse angled member 17 having a vertical and a horizontal flange and with the former abutting the horizontal flange of a transverse angled-shaped member 18, the latter being also formed with a vertical flange. Seated upon the rear ends of the horizontal legs of the parts 10 of the side rails 8 is a transverse angled-shaped member 19 having a vertical and a horizontal flange and with the former abutting the horizontal flange of a transverse angle-shaped member 20, the latter being also formed with a vertical flange. Secured to, between, upon and extending inwardly from the corner rails 4, 7 is a front lower end rail 21 of angle-shaped cross section formed of a vertical leg and an inwardly extending horizontal leg, and upon the latter and spaced from the former is the member 18. Secured to, between, upon and extending inwardly from the corner rails 5, 6 is a rear lower end rail 22 of angle-shaped cross section formed of a vertical leg and an inwardly extending horizontal leg, and upon the latter and spaced from the former is the member 20. The floor sections 11 and 13 are secured upon the horizontal legs of members 17, 19 respectively.

The end rails 21, 22 are secured upon a subframe consisting of a pair of sills 23, 24 disposed lengthwise with respect to the lower deck, extending from rail 22, projecting rearwardly from rail 21 and secured to a bumper, reinforcing or protecting element 25. Each sill is arranged between the longitudinal median and a side edge of the deck 1. The element 25 extends outwardly in a lateral direction from each sill.

Secured with, extended laterally from and coextensive with each side of the deck 1 is a running board 26 provided intermediate its ends with an arch shaped wheel fender 27 formed with an outer and an inner part 28, 29 respectively, the former being of greater width than the latter. The part 29 is positioned within a cutout 14 of the floor section 12. The inner end of the fender has a closure plate 30 therefor. An arch shaped member 31 is arranged at and within the outer end of the fender. Reinforcing angle shaped straps 32, 33 are arranged at the inner and outer ends of the fender, and the latter depends below the floor of deck 1. The parts 9, 10 of a side rail 8 are secured against the inner end of part 28 of the fender. Combined brace and coupling members 34 are connected to deck 1 extended outwardly therefrom and are secured to the running board 26 and to the fenders. An inclined combined brace and coupling member 35 is arranged at the front end of each running board and is secured to the latter and deck 1.

The deck 2 includes a pair of side rails 36 and a pair of end rails 37. Each of said rails includes an inwardly extending horizontal leg and a vertically disposed leg. The end rails 37 align with the members 17, 19. The rails 36 are of greater height than rails 37. The deck 2 also includes spaced pairs of angle-shaped bars 38, 39 and corrugated floor sections 40, 41, 42 of the same form and set up in the same manner with respect to the side rails 36 and end rails as the floor sections 11, 12 and 13 and the bars 15, 16 are set up with respect to side rails 8 and members 17, 19. Secured to the bottoms of end rails 37 is T-shaped sill or brace 43 disposed lengthwise of deck 2 and which also are secured to bars 38, 39. The sill 43 is disposed at the longitudinal median of the bottom side of deck 2.

The upper deck 3 includes side rails 44 and end rails 45. Each of said rails being of angle-shaped cross section and formed with a vertical and a horizontal leg. The deck 3 further includes angle-shaped bars 46 and 47 of the same form and set up in the same manner as the bars 15, 16, 38 and 39, and secured upon the horizontal legs or flanges of the rails 44, 45 and bars 46 and 47 are floor sections 48, 49 and 50. The deck 3 is provided with a sill or brace 51 arranged at the longitudinal median of the bottom thereof, in the same manner as the sill 43 is arranged with respect to the bottom of deck 2.

The end rails 45 have secured to the bottoms of the horizontal legs thereof the horizontal legs of angle-shaped cross bars 52 having depending vertical legs which are flush with the vertical legs of the rails 45. Secured to the lower face of the horizontal legs of bars 52 are the horizontal legs of angle-shaped cross members 53 which align with cross members 18 and 20 and have vertical legs spaced from the vertical legs of the bars 52. At the rear end of the truck body a closure plate 54 is arranged and which extends from one of the cross bars 52 to the horizontal leg of end member 21. At the forward end of the truck body a closure plate 55 is arranged and which extends from the other bar 52 to the horizontal flange of end rail 22. The plate 54 is positioned within a cross bar 52 and end rail 21 and abuts the vertical flange of cross members 18 and that of a cross member 53. The plate 55 is positioned within the other cross bar 52 and end rail 22 and abuts the vertical flange of cross member 20 and that of the other cross member 53.

Extending from the horizontal flange of a cross member 53 to that of cross member 18, as well as abutting the inner face of plate 54 is a set of spaced upright supports 56 of channel shaped cross section. Extending from the horizontal flange of the other cross member 53 to that of cross member 20 is a set of spaced upright supports 57 of channel shaped cross section. Certain of the supports of each set align with the sills 23, 24.

The truck body between the ends thereof includes upright column supports 58 for the upper decks. The supports are arranged in pairs, the supports of each pair are arranged in parallel spaced relation. As shown in Figures 1 to 4 and 6 to 10, the supports are perpendicular and arranged within and spaced from the sides of the decks. The supports extend from the sills 23, 24, between the bars 15, 16 of each pair, the pairs 38, 39 of each pair and the bars 46, 47. Each support 58 is common to the upper decks and is secured to the bars 15, 16, 38, 39 and 46, 47.

Arranged at each end of the upper deck is an arch shaped supporting member 58' for one end of a sign board 59, the latter seats upon the center of the top of said members 58' and are coupled therewith as at 60. Each end of each member 58' consists of a vertically disposed socket forming part 61 into which extends a post 62 secured to a corner of the upper deck 3. The lower portion of the outer side of each end of each member 58' is rabbeted for overlapping the top edge of a corner piece and in this connection see Figure 7. The parts 61 are secured to the posts 62 by holdfast means 63.

The bars 15, 16 in connection with the cross members 17, 19 divide the deck 1 into a plurality of compartments or sections. The bars 38, 39 in connection with the end rails 37 divide deck 2 into a plurality of walled sections or compartments, and the bars 46, 47 in connection with the end rails 45 divide the deck 2 into a plurality of compartments or sections.

The supports 58 are shown perpendicular and the supports 58 of each pair in parallel spaced relation, but they can be arranged whereby the supports of each pair may extend at opposite inclinations, and in this connection reference is had to Figure 5 which shows the supports of a pair, the supports being designated 64, as extending at opposite inclinations towards the sides of the decks. Otherwise than as stated, the construction shown in Figure 5 would be the same as that shown in Figures 1 to 4 and 6 to 10.

In lieu of employing the supports of the set 56 or 57 in parallel spaced relation, they can be set up as shown in Figure 6 and with reference to the latter, the set of supports will consist of a perpendicular central support 54', and a pair of oppositely inclined outer supports 57'. The supports 54' and 57' are secured and arranged in the structure in the manner in which supports 56 and 57 are. The supports 54', 57' are of channel shaped cross section.

Figure 12:
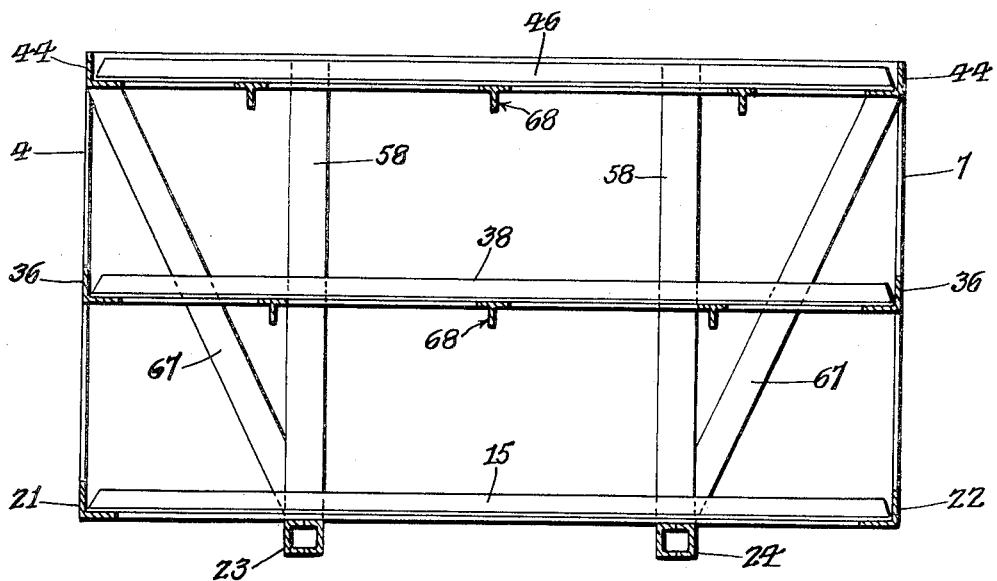
Figure 12 is a view similar to Figure 11 of still another modified form of the truck body.

With reference to Figure 11 there is employed in addition to the supports 58 for a wide truck body an upper and a lower truss brace structure 65, 66 respectively which are arranged between and exteriorly of each pair of supports 58. Figure 12 discloses oppositely extending inclined supports 67 which are used in connection with each pair of supports 58 in case of a wide truck body. The supports 67 are arranged exteriorly of supports of each pair of supports 58. In Figures 11 and 12, a set of spaced T-sills or braces 68 can be substituted for a single T-sill or brace for the bottoms of decks 2 and 3.

In lieu of employing a single T-sill or brace or a set of T-sills or braces for the bottom of an upper deck, a pair of intersecting diagonally disposed T-sills or braces can be employed for the bottoms of the upper decks and in this connection see Figure 13 in which the diagonally disposed T-sills or braces are shown and indicated at 69.

The intermediate supports 58 as shown heretofore for the upper decks, can be set up in the forms as shown by Figures 14 to 19 both inclusive. In Figure 14 an inverted T-shaped cross member 70 between the side rails of a deck 2 is shown and which has a pair of spaced upstanding perpendicular supports 71 secured to the top edge and a pair of spaced depending supports 72 secured to the bottom thereof. In Figure 15 there is substituted for the cross member 70 a cross member 73 of circular cross section. In Figure 16 there is substituted for the cross members 70 and 73 a cross member 74 consisting of a pair of oppositely disposed angle-shaped bars having their vertical flanges secured together. In Figure 17 a cross member 75 of oblong contour is secured at its lower lengthwise edge to the deck flooring as shown, and to its upper lengthwise edge is secured the lower end of the perpendicular supports 76, only one of which is shown. To the bottom of the deck flooring below member 75 is secured the upper ends of depending perpendicular supports 76', only one of which is shown. Arranged adjacent to the member 75 is a flat transverse supporting member 77 for the floor section and which is secured to the side rails of the deck. With reference to Figure 18, the cross member 78 is formed of a pair of oppositely disposed angle-shaped bars having the vertical flanges thereof secured together in abutting arrangement to form an element of inverted T-shape. Secured to member 78 are two pair of spaced parallel perpendicular supports, only one pair being shown. The supports of the pair are indicated at 79, are arranged in spaced relation and abut the sides of the stem and upper face of the bottom of cross member 78. Depending from and secured at their upper ends to the bottom of member 78 is a pair of spaced parallel perpendicular supports 81. With reference to Figure 19, the cross member 82 is shown as consisting of a pair of angle bars, one being inverted, secured to the other and having its horizontal flange arranged in alignment with the horizontal flange of the other. The upper support may be secured to one side or the other side of the vertical flange of the non-inverted bar and is shown by way of example as being secured to that side of such flange from which the horizontal flange does not extend. The upper support is designated 82. The lower support 83 can be secured to the bottom of the horizontal flange of either of the bars and is shown by way of example as being secured to that side of such flange from which the horizontal flange does not extend. The upper support is designated 82. The lower support 83 can be secured to the bottom of the horizontal flange of either of the bars and is shown by way of example as being secured to horizontal flange of the inverted bar.

The supports shown in Figures 14 to 19 are arranged in alignment with the sills 23, 24. The cross members shown in Figures 14 to 19 provide a function similar to the elements 15, 16, 38, 39, 46 and 47 referred to.

Referring to Figure 20 the form illustrated thereby with respect to the bumper, the latter being indicated at 84 has its ends 85 spaced from the lower deck 86 and it is connected with the sills of the sub-frame for the deck 86, as at 87. The deck 86 is not provided with running boards.

With reference to Figure 21 the lower deck is indicated at 88 and is provided with running boards 89. The modified form of bumper shown in Figure 21 and which is indicated at 90 has its ends opposing and spaced from the running boards 89. The bumper 90 is connected with the sub-frame as at 92.

With reference to Figure 22 the deck indicated at 93 is provided with a cross member 94 of the same form as that employed in connection with the decks 1, 2 and 3. Extending through and secured to cross member 94 are oppositely inclined, upstanding supports or columns for the decks and which are indicated at 95. The deck 93 is formed with lengthwise extending T-shaped braces 96, 97 and 98. The brace 97 is disposed centrally with respect to the bottom of the deck 93 and the braces 96, 98 align with the supports 95. The brace 97 is disposed centrally with respect to the pair of supports 95. The form shown in Figure 23 is the same as that shown in Figure 22, with this exception that the longitudinal braces for the deck and which are indicated at 99, 100 and 101 have the supports 95 arranged therebetween. Other than that as stated, the form shown in Figure 23 is the same as that shown in Figure 22.

Referring to Figure 24, a pair of upper decks are indicated at 102, 103 and which are shown as provided with cross members 104, 105 respectively. The cross members are of the form employed in connection with the decks 1, 2 and 3. A pair of vertically disposed, spaced supports or columns 106 for the decks 102 and 103 extend through and are secured to cross members 104 and 105. Oppositely extending, inclined supports 107 are provided for decks 102 and 103 and said supports are arranged exteriorly of the supports 106 and extend through and are secured to the cross members 104, 105. The supports 107 extend from points inwardly of the ends of a lower cross member to the ends of an upper cross member.

Referring to Figures 25 and 26, a cross member 108 is shown and which consists of a pair of oppositely disposed T's secured to each other. The T's are indicated at 109, 110 and secured to the vertical leg of the T 109 is a deck support or column 111. Secured to the vertical leg of the T 110 is a deck support or column 112. The floor sections of the decks with which the cross member 108 is employed are indicated at 113, 114.

Figure 27:
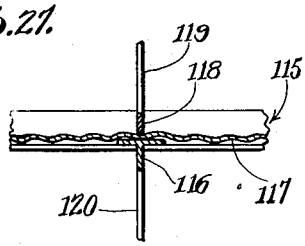

Referring to Figure 27, the deck indicated at 115 includes a T 116 upon the head of which the flooring 117 is secured. Arranged on the flooring 117 as well as being fixedly secured thereto and aligning with the vertical leg of the T 116 is an oblong plate 118 standing on its lower longitudinal edge. Secured to the plate or bar 118 is a vertical deck support or column 119 which aligns with a vertical support or column 120. The column 120 is secured to the vertical leg of the T 116.

Figure 28:
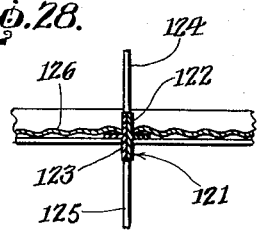

Referring to Figure 28, the cross member is indicated at 121 and consists of a pair of T's 122, 123 having their heads secured together. Upstanding deck supports or columns are designated at 124, 125 and the former is secured to the top edge of cross member 121 and the latter to the bottom edge of cross member 121. The floor sections of the deck and which are indicated at 126 are secured upon the stems of the T's 122, 123.

Figure 29:
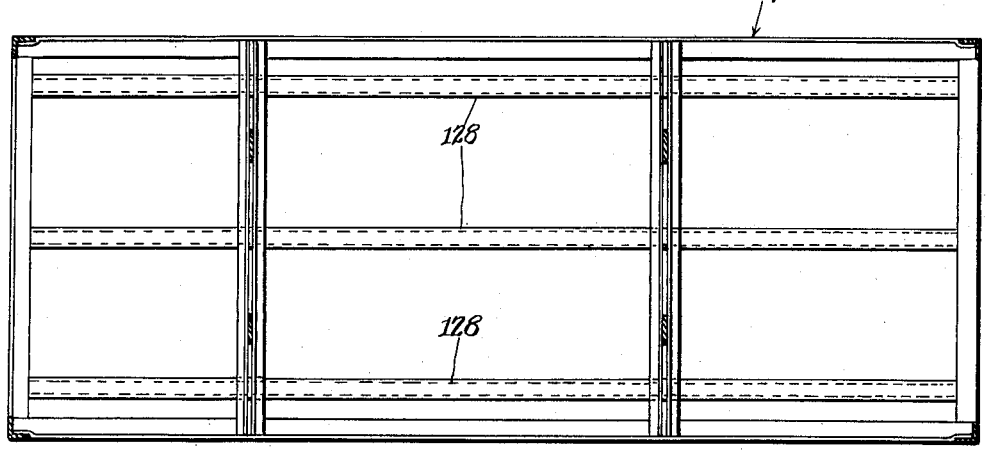
Figure 29 is a sectional plan illustrating a modified form of deck.

Referring to Figure 29, the deck shown thereby and indicated at 127, would be of a form similar to decks 1, 2 and 3 with this exception, that in lieu of providing the bottom of the deck with lengthwise extending braces of T-shaped cross section, a series of spaced, inverted channel irons 128 are employed which are arranged in parallelism.

Figure 30:
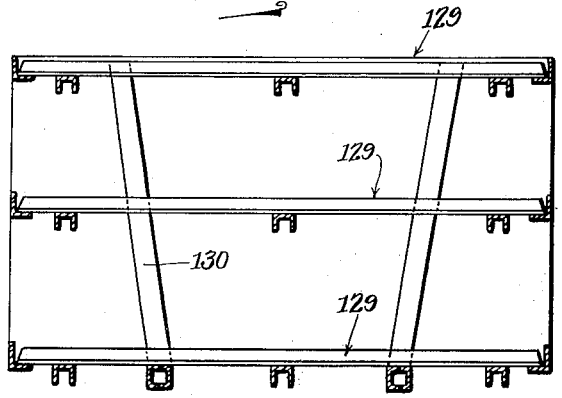
Figure 30 is a cross sectional view illustrating a modified form of lengthwise extending bracing means for the decks.

Referring to Figure 30, the deck indicated at 129 as shown thereby would be of a construction similar to that shown in Figure 29 with this exception, the upright supports or columns for the deck and which are indicated at 130 are disposed at opposite inclinations with respect to each other and extend through the cross members of each of the decks.

What I claim is:—

1. In a truck body, a plurality of decks, a plurality of spaced parallel sills extending longitudinally with respect to the lowermost deck, a plurality of spaced parallel cross members in the bottom of each deck and each including a pair of spaced, fixed, parallel sections, and upstanding spaced supports spaced inwardly of the ends of said cross members and each of a length extending from a sill through a cross member in the bottoms of the lower decks and into a cross member in the bottom of the uppermost deck, said supports being secured to said sills and the sections of the cross members of the said plurality of decks, said cross members being of inverted T-shape, each deck including floor sections, each of said decks having means at its sides and ends coacting with the cross members in its bottom to provide supports for its floor sections, the said means at the sides of said decks supporting the cross members, the said means at the sides of the lowermost deck supporting the cross members for the latter and in spaced relation with respect to said sills, the floor sections of each deck being secured to the supports provided by the means at the side and ends and the cross members in the bottom of the deck.

2. In a truck body, a plurality of decks, a plurality of spaced parallel sills extending longitudinally with respect to the lowermost deck, a plurality of spaced parallel cross members in the bottom of each deck and each including a pair of spaced, fixed, parallel sections, upstanding spaced supports spaced inwardly of the ends of said cross members and each of a length extending from a sill through a cross member in the bottoms of the lower decks and into a cross member in the bottom of the uppermost deck, said supports being secured to said sills and sections of the cross members of the said plurality of decks, said cross member being of inverted T-shape, each deck including floor sections, each of said decks having means at its sides and ends coacting with the cross members in its bottom to provide supports for its floor sections, the said means at the sides of said decks supporting the cross members, the said means at the sides of the lowermost deck supporting the cross members for the latter and in paced relation with respect to said sills, and each of said decks having means at its sides and ends coacting with the cross members in the bottom thereof and said floor sections to provide the deck with a plurality of independent closed bottom, open top and walled compartments or sections.

3. In a truck body, a deck, a fixed post at each corner of said deck, a signboard support extended transversely of each end of said deck, each of said supports having each end in the form of a depending portion seating on said deck and formed with a vertical socket, said posts being extended into said sockets, each of said depending portions being rabbeted on its outer side for overlapping a corner edge of the deck, and means for detachably connecting the posts to the socketed ends of said supports.

4. In a truck body, a plurality of rectangular decks arranged in superposed spaced relation, means for connecting said decks together and for maintaining them in spaced relation, a plurality of spaced sills for the lowermost deck and extending from the rear end of the latter for connection to a bumper, said sills arranged inwardly with respect to the sides of the lowermost deck and secured to the front and rear end of the latter, running boards disposed lengthwise and against the outer faces of the sides of the lowermost deck, extending laterally from each side of the latter and each having an upstanding portion intermediate its ends to provide a wheel fender partly extending into a side of the lowermost deck, and spaced, horizontally disposed, combined suporting and bracing means secured to the outer side of the sills, lower faces of the sides of the lowermost deck and to the lower faces of the running boards.

5. In a truck body, a plurality of decks arranged in superposed spaced relation, means for connecting said decks together and for maintaining them in spaced relation, a plurality of spaced parallel sills for and secured to the ends of the lowermost deck and arranged inwardly of the sides of the latter, a plurality of spaced parallel cross units arranged in the bottom of each of said decks and each consisting of a pair of fixed spaced parallel sections, a brace extending lengthwise with respect to the bottom of each upper deck and secured to the bottoms of the cross units in the bottom of such deck, upstanding spaced supports arranged inwardly with respect to the sides of each of the lower decks and of a length to be secured to and extend through the cross units in each of said decks and seated on said sills, and floor sections seated upon the side ends of said decks, upon said cross members and bearing on said braces and sills.

6. In a truck body, a plurality of decks arranged in superposed spaced relation, means for connecting said decks together and for maintaining them in spaced relation, a sub-frame for and secured to the ends of the lowermost deck, a plurality of spaced parallel cross units arranged in the bottom of each of said decks, a sill extending lengthwise with respect to the bottom of each upper deck and secured to the bottoms of the cross units in the bottom of such deck, upstanding spaced supports arranged inwardly with respect to the sides of each of the lower decks and secured to the cross units in each of said decks, and said supports being secured directly at their lower ends to said sub-frame.

7. In a truck body of the plural deck type, spaced floor sections for each deck, cross members interposed between and having means for supporting the floor sections, and inclined spaced deck supports arranged between said decks and secured at their ends and intermediate their ends within said cross members adjacent the ends of the latter and spaced sills secured to the lower face of the lowermost deck and to the lower ends of said inclined deck supports, the latter extending from the sills to within the cross members of the uppermost deck.

8. In a truck body of the plural deck type, spaced floor sections for each deck, cross members interposed between and having means for supporting the floor sections, and vertical and inclined spaced deck supports arranged between the decks and secured at their ends and intermediate their ends within said cross members adjacent the ends of the latter and spaced sills secured to the lower face of the lowermost deck and to the lower ends of said inclined deck supports, the latter extending from the sills to within the cross members of the uppermost deck.

WILL S. TATUM.